Figure 3:
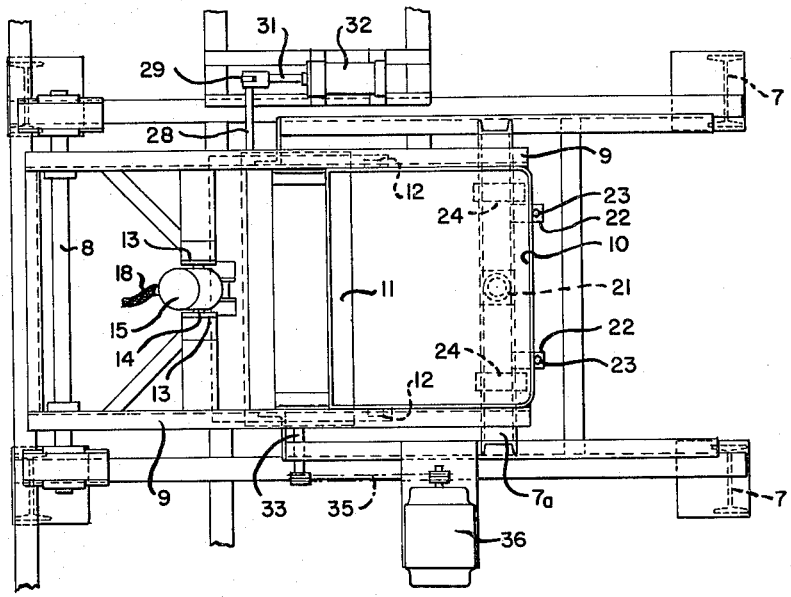

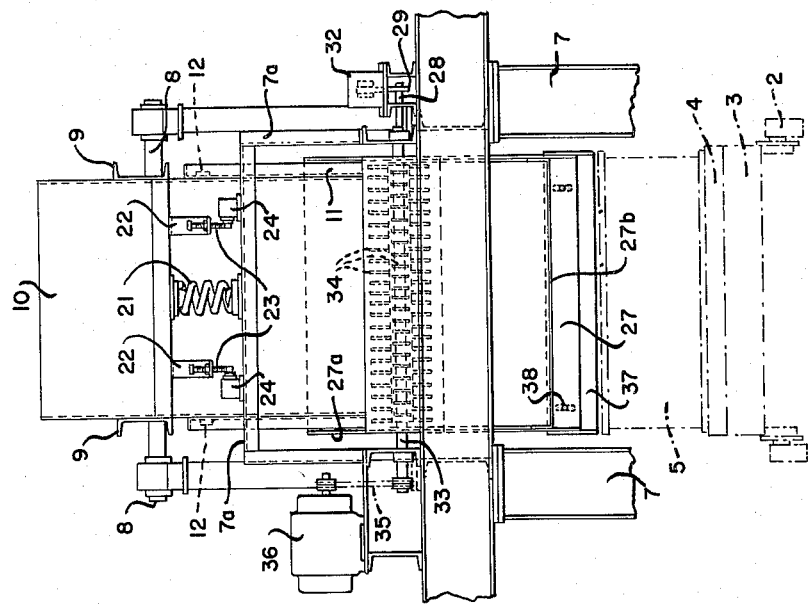

Nov. 7, 1961                L. L. JOHNSTON                3,007,216
                            MOLDING APPARATUS

Filed Oct. 20, 1958                                    2 Sheets-Sheet 2

INVENTOR
Loyal L. Johnston

United States Patent Office

3,007,216
Patented Nov. 7, 1961

3,007,216
MOLDING APPARATUS
Loyal L. Johnston, Zelienople, Pa., assignor to Herman Pneumatic Machine Company, Pittsburgh, Pa., a corporation of Pennsylvania
Filed Oct. 20, 1958, Ser. No. 768,308
5 Claims. (Cl. 22—35)

This invention relates to molding apparatus and more particularly to molding apparatus for the making of foundry molds using finely divided mold forming material. The invention is concerned primarily with the preparation and measuring of finely divided mold forming material and the delivery of the prepared and measured mold forming material into flasks and against the patterns to which the flasks are assembled to form foundry molds.

In copending applications Serial Nos. 767,599 and 767,600, filed October 16, 1958, there is disclosed molding apparatus for the formation of foundry molds in which finely divided mold forming material, such, for example, as specially prepared foundry molding sand, is delivered into flasks and upon the patterns to which the flasks are assembled as the assembled flasks and patterns move from one station to another in the molding apparatus. In those applications there is disclosed an operating station from which an assembled mold and pattern are moved to another operating station. During such movement finely divided mold forming material is introduced into the flask and upon the pattern and the mold forming material is struck off. At the second station the mold forming material is compacted and then the flask and pattern with the compacted mold therein and thereagainst are returned to the first station where the flask and mold are elevated to strip them from the pattern. The present invention is concerned with improvements which are applicable to apparatus of the type disclosed in said copending applications but which are also applicable to apparatus of various other types.

I provide for accurately measuring the quantity of mold forming material introduced into each flask and for agitating and aerating the mold forming material after it has been measured and as it is being delivered to the flask. I also provide unique means for delivering the mold forming material into the flask at the operating station at which subsequently the flask and mold are to be elevated to strip them from the pattern, such mold forming material delivering means having a shiftable portion which may be shifted to an out of the way position to permit elevating of the flask and mold when the flask and mold are stripped from the pattern.

I provide molding apparatus comprising a chute for delivering finely divided mold forming material into a flask assembled to a pattern to form a mold together with means for delivering finely divided mold forming material to the chute and means agitating and aerating the finely divided mold forming material as it moves to and through the chute.

I preferably employ a receptacle for finely divided mold forming material, the receptacle having an outlet through which finely divided mold forming material passes into a flask assembled to a pattern to form a mold, together with means disposed outside the outlet in the path of finely divided mold forming material passing from the outlet into the flask agitating and aerating the finely divided mold forming material. A chute preferably receives the finely divided mold forming material passing through the outlet of the receptacle and directs such material into the flask, the agitating and aerating means desirably being disposed in the chute.

I further provide molding apparatus comprising means for moving a predetermined path a flask assembled to a pattern, means for delivering finely divided mold forming material into the flask and upon the pattern to form a mold while the assembled flask and pattern are in said predetermined path and means for measuring and discharging to said last mentioned means a predetermined quantity of finely divided mold forming material for delivery into the flask and upon the pattern. I preferably utilize a receptacle for the finely divided mold forming material having a discharge outlet through which the material is discharged together with closure means for the discharge outlet of the receptacle so that a quantity of finely divided mold forming material may be retained in the receptacle and means for opening the closure means to discharge said quantity of finely divided mold forming material from the receptacle into the flask and upon the pattern to form a mold.

In a preferred form my apparatus comprises a receptacle for finely divided mold forming material having a discharge outlet through which the finely divided mold forming material in the receptacle is discharged to be delivered into a flask and upon a pattern to which the flask is assembled to form a mold, closure means for the discharge outlet of the receptacle so that a quantity of finely divided mold forming material may be retained in the receptacle, means for delivering finely divided mold forming material into the receptacle, means for opening the closure means to discharge said quantity of finely divided mold forming material from the receptacle into the flask and upon the pattern to form a mold and means preventing operating of the means for delivering finely divided mold forming material into the receptacle when the closure means for the discharge outlet of the receptacle is open.

In predetermining the quantity of mold forming material to be delivered into a flask I preferably provide means for delivering finely divided mold forming material into the receptacle which in turn discharges the material into the flask together with means for controlling such delivering means to discontinue delivery of material into the receptacle when a predetermined quantity of material has been so delivered. I preferably employ means for selectively controlling the means for delivering the finely divided mold forming material into the receptacle to discontinue delivery of such material into the receptacle when one or another of certain predetermined quantities of such material has been so delivered together with means for opening the closure means for the discharge outlet of the receptacle to discharge said selected predetermined quantity of finely divided mold forming material from the receptacle into a flask and upon the pattern to which the flask is assembled to form a mold.

I further provide molding apparatus comprising means for moving in a predetermined path a flask assembled to a pattern and means for delivering finely divided mold forming material into the flask and upon the pattern to form a mold while the assembled flask and pattern are moving in said predetermined path, said last mentioned means including a material guiding member whose delivery end is shiftable generally along said path so that when said guiding member has its delivery end shifted along said path in the direction opposite the direction of movement of the flask and pattern along said path finely devided mold forming material may be delivered into the flask and upon the pattern in a position which would not be reached by the guiding member when its delivery end is shifted along said path in the direction of movement of the flask and pattern along said path. In a preferred form such apparatus comprises an operating station at which a flask containing a compacted mold of finely divided mold forming material is adapted to be elevated to strip the mold from the pattern on which the mold was formed, means for moving the flask and pattern generally horizontally to and from the operating station and means for delivering finely divided mold forming material into the flask and upon the pattern to form a mold while the flask and pattern are moving away from the operating station, said last mentioned means including a material guiding member whose delivery end is shiftable between a position above a portion of the flask when the flask and pattern are positioned at the operating station to provide for initiation of the filling of the flask with finely divided mold forming material while the flask and pattern are positioned at the operating station and a position offset from the flask to permit elevating the flask to strip the mold from the pattern. I preferably utilize a chute for delivering the finely divided mold forming material into the flask and upon the pattern to form a mold while the flask and pattern are moving away from the operating station, the chute including a fixedly positioned primary chute member and a secondary chute member which may be substantially nested to the primary chute member but whose delivery end is shiftable between a position above a position of the flask when the flask and pattern are positioned at the operating station to provide for initiation of the filling of the flask with finely divided mold forming material while the flask and pattern are positioned at the operating station and nested position relatively to the primary chute member to permit elevating the flask to strip the mold from the pattern. I also preferably provide strike off means positioned to strike off the mold forming material as the flask and pattern with the mold forming material delivered thereto are moving away from the operating station.

Other details, objects and advantages of the invention will become apparent as the following description of a present preferred embodiment thereof proceeds.

In the accompanying drawings I have shown a present preferred embodiment of the invention in which FIGURE 1 is a fragmentary more or less diagrammatic elevational view of molding apparatus;

FIGURE 2 is a fragmentary elevational view showing a portion of the apparatus showing in FIGURE 1 as viewed from the right-hand side of FIGURE 1; and FIGURE 3 is a fragmentary plan view of a portion of the apparatus shown in FIGURE 1.

Referring now more particularly to the drawings, the molding apparatus may as a whole be of the type shown in said copending applications and may include a roller conveyor 2 for conveying a carrier 3, a pattern 4 and a flask 5 from right to left viewing FIGURE 1 and back again. The roller conveyor 2 may be provided with means for moving it to a limited extent vertically so that it may move down to a position in which it deposits the carrier, pattern and flask at an operating station so that operations may be performed thereon at that station and may move up to an operative position lifting the carrier, pattern and flask from the supporting means at the station so that the carrier, pattern and flask may be moved on the conveyor from one station to another. I have not shown in the drawings of the present application details of the apparatus which are shown in said copending applications and with which my invention is not particularly concerned. I have shown diagrammatically in FIGURE 1 vertically movable stripping means 6 as shown in said copending applications for elevating the flask with a compacted mold therein to strip the flask and mold from the pattern since part of my apparatus is concerned with provision for delivering finely divided mold forming material into a flask at the stripping station yet clearing the space above the flask to permit elevating the flask in stripping.

The supporting framework of the molding apparatus is designated generally by reference numeral 7. Pivoted to the framework for movement about a horizontal axis 8 is a beam 9 carrying an open-topped receptacle or hopper 10 for receiving and measuring quantities of finely divided mold forming material. The hopper 10 has a closure member 11 which may close the bottom of the hopper so that material will be retained in the hopper and which is movable to withdrawn or inoperative position to permit material in the hopper to be discharged therefrom by gravity. The closure member 11 is pivotally mounted to turn about an axis 12 in movement between its operative and inoperative positions. It is shown in FIGURE 1 in operative position, i.e., in position closing the bottom of the hopper to retain material in the hopper.

The beam 9 carries brackets 13 having trunnions 14 pivotally mounting a cylinder 15 in which operates a piston carrying a piston rod 16 which is pivotally connected to the closure member 11 at 17. Fluid under pressure is admitted to and discharged from the respective ends of the cylinder 15 through conduits 18. When fluid under pressure is admitted below the piston in the cylinder 15 the piston rises and draws the closure member 11 generally upwardly and to the left viewing FIGURE 1 to open the bottom of the hopper and permit discharge therefrom by gravity of the material contained therein. When fluid under pressure is admitted above the piston in the cylinder 15 the closure member 11 is returned to operative position closing the bottom of the hopper as shown in FIGURE 1.

Finely divided mold forming material, which may be specially prepared foundry sand, is stored in a storage bin 19 which delivers it upon a feed belt 20 whose upper reach moves toward the left viewing FIGURE 1 and which delivers the mold forming material into the open top of the hopper 10. The feed belt 20 is driven by a motor which is not shown in the drawings.

The right-hand end of the beam 9 viewing FIGURE 1 is supported by a spring 21 atop a portion 7a of the supporting framework, and as material is delivered from the feed belt 20 into the hopper 10 with the closure member 11 closed as shown in FIGURE 1 the gradually increasing weight of the hopper and contents causes the beam 9 to turn in the clockwise direction viewing FIGURE 1 about the axis 8 so that the right-hand end of the beam moves generally downwardly and in so doing progressively compresses the spring 21. The right-hand end of the beam 9 viewing FIGURE 1 carries two brackets 22 each having an adjustable detent 23 projecting downwardly therefrom and cooperating with a switch 24, there being two such switches, one cooperating with each of the detents 23, as shown in FIGURE 2. Control mechanism is provided so that either of the switches 24 as desired by the operator may be rendered operative during a hopper filling operation; that may be accomplished by throwing a selector switch. Each time the hopper is filled the one of the switches 24 thus selected by the operator is effective when operated by its detent 23 to stop the motor driving the feed belt 20 and hence to stop delivery of mold forming material into the hopper 10. Thus provision is made for delivering a measured or weighed amount of finely divided mold forming material into the hopper at each cycle.

The reason for having the two switches 24 either of which may be rendered operative to control the feed belt 20 is that during a run of the molding apparatus different amounts of mold forming material may be desired to be delivered to different flasks. For example, flasks may be assembled to patterns to form alternately molds for the cope and drag portions respectively of a complete foundry mold, and different amounts of mold forming material may be required for the cope and drag portions. One of the switches 24 may be selected by the operator to control the feed belt 20 when a cope mold is to be formed and the other may be selected when a drag mold is to be formed. Whichever of the switches 24 is selected by the operator for operation upon a particular cycle determines the quantity of mold forming material delivered into the hopper 10 in that cycle by stopping the feed belt 20 at the proper time. Thus upon each cycle the hopper 10 will contain a predetermined quantity of mold forming material.

When during a run of the molding apparatus cope and drag molds are to be alternately formed automatically operable means may be employed for throwing the selector switch at each cycle so that the switches 24 will be alternately effective for stopping the feed belt 20.

A safety switch 25 carried by the beam 9 is operated by a detent 26 carried by a portion of the closure member 11 adjacent the axis 12 to insure against delivery of mold forming material into the hopper when the closure member 11 is in open or inoperative position. The safety switch 25 may simply close a relay when the closure member 11 is in closed or operative position allowing the motor for the feed belt 20 to operate as will be understood by those skilled in the art.

With a measured amount of mold forming material in the hopper 10 a pattern 4 with an empty flask 5 assembled thereto is disposed at the operating station as shown in FIGURE 1. Receiving the mold forming material from the hopper 10 is a chute 27 carried by the framework 7 having a primary chute member 27a and a secondary chute member 27b as shown in FIGURE 1. The primary chute member 27a is fixedly mounted while the secondary chute member 27b is pivoted to the primary chute member 27a at 28 and is adapted to be pivotally moved back and forth as indicated by the arrow A in FIGURE 1 between an inclined position with its delivery end disposed over the near edge of the flask 5 and a vertical position nested with the primary chute member 27a. An arm 29 is connected with and extends upwardly from the chute member 27b and has a lost motion connection at 30 with a piston rod 31 connected with a piston in a cylinder 32 carried by the framework. Provision is made by means not shown for admitting fluid under pressure at each side of the piston in the cylinder 32. When the piston is moved to the left viewing FIGURE 1 the chute member 27b is swung out to the inclined position with its discharge end over the flask 5 while when the piston is moved to the right the chute member 27b is swung to the left and is substantially nested to the chute member 27a.

Disposed in the top of the chute 27 is a rotatable shaft 33 carrying a series of blades 34 for agitating and aerating the finely divided mold forming material as it is delivered from the hopper 10 through the chute 27 into the flask 5. The shaft 33 is driven through a belt 35 by an electric motor 36.

A cycle of operation of the molding apparatus will now be described. At the beginning of the cycle an empty flask 5 assembled to a pattern 4 on a carrier 3 is disposed at the operating station as shown in FIGURE 1. The closure member 11 is closed and hence the safety switch 25 is operated permitting driving of the feed belt 20. The feed belt is driven to deliver mold forming material into the hopper 10 until whichever switch 24 has been selected by the operator to be operative upon that particular cycle causes stopping of the belt 20. At that time a desired predetermined or measured amount of finely divided mold forming material is disposed in the hopper. The motor 36 is energized to drive the aerator 33, 34 and the closure member 11 is moved upwardly and to the left viewing FIGURE 1 to inoperative position. This permits the mold forming material in the hopper 10 to move downwardly by gravity through the aerator and the chute. At such time the chute member 27b is in the inclined poisiton as shown in FIGURE 1. As the first mold forming material passes down through the chute into the flask the flask is standing still in the position in which it is shown in FIGURE 1, but as soon as the left-hand portion of the flask viewing FIGURE 1, i.e., the portion below the chute member 27b, is sufficiently filled with mold forming material the flask together with the pattern 4 to which it is assembled and the carrier 3 which carries the flask and pattern moves toward the left viewing FIGURE 1. During such movement the mold forming material continues to be delivered into the flask until the full measured quantity of such material has been delivered, filling the flask to the desired extent. As the flask moves under the chute 27 and adjustable strike-off member 37 automatically strikes off the mold forming material. The strike-off member 37 is adjusted to proper height on the chute by any suitable means such as bolts 38 operating in elongated slots in one or the other of the strike-off member and chute.

The carrier, pattern and flask with the flask filled with uncompacted mold forming material are after the movement toward the left viewing FIGURE 1 just described disposed to the left viewing FIGURE 1 at a compacting station which is not shown since the present invention is not concerned with the manner of compacting of the mold forming material. The mold forming material is compacted in the mold and against the pattern at the compacting station. The compacting may be accomplished by squeezing or jolting or both. I prefer to employ squeezing and jolting simultaneously as disclosed in copending application Serial No. 745,381, filed June 30, 1958, now Patent 2,959,825, issued November 15, 1960. After the mold has been compacted in the flask against the pattern the carrier carrying the pattern and flask with the compacted mold therein and thereagainst moves back to the operating station as shown in FIGURE 1. At that time the chute member 27b is swung to the left to its nested position with the chute member 27a, clearing the space above the flask so that the flask may be elevated by the stripping means 6 to strip the mold from the pattern. The flask with the compacted stripped mold therein may be conveyed away by means forming no part of the present invention and a new empty flask is assembled to the pattern whereupon the cycle may be repeated.

While I have shown and described a present preferred embodiment of the invention it is to be distinctly understood that the invention is not limited thereto but may be otherwise variously embodied within the scope of the following claims.

I claim:

1. Molding apparatus comprising a receptacle for finely divided mold forming material having a discharge outlet through which the finely divided mold forming material in the receptacle is discharged to be delivered into a flask and upon a pattern to which the flask is assembled to form a mold, closure means for the discharge outlet of the receptacle so that a quantity of finely divided mold forming material may be retained in the receptacle, a conveyor for delivering finely divided mold forming material into the receptacle, weight responsive means for controlling the conveyor to discontinue delivery of finely divided mold forming material into the receptacle when a predetermined weight of such material has been so delivered and means for opening the closure means to discharge said predetermined weight of finely divided mold forming material from the receptacle into the flask and upon the pattern to form a mold.

2. Molding apparatus comprising a receptacle for finely divided mold forming material having a discharge outlet through which the finely divided mold forming material in the receptacle is discharged to be delivered into a flask and upon a pattern to which the flask is assembled to form a mold, closure means for the discharge outlet of the receptacle so that a quantity of finely divided mold forming material may be retained in the receptacle, a conveyor for delivering finely divided mold forming material into the receptacle, weight responsive means for controlling the conveyor to discontinue delivery of finely divided mold forming material into the receptacle when a predetermined weight of such material has been so delivered, means for opening the closure means to discharge said predetermined weight of finely divided mold forming material from the receptacle into the flask and upon the pattern to form a mold and means outside the receptacle in the path of movement of the finely divided mold forming material from the receptacle into the flask agitating and aerating the finely divided mold forming material.

3. Molding apparatus comprising means for moving in a predetermined path a flask assembled to a pattern, a receptacle for finely divided mold forming material having a discharge outlet through which the finely divided mold forming material in the receptacle is discharged to be delivered into the flask and upon the pattern to form a mold while the assembled flask and pattern are in said predetermined path, closure means for the discharge outlet of the receptacle so that a quantity of finely divided mold forming material may be retained in the receptacle, means for delivering finely divided mold forming material into the receptacle, weight responsive means for controlling the last mentioned means to discontinue delivery of finely divided mold forming material into the receptacle when a predetermined weight of such material has been so delivered and means for opening the closure means to discharge said predetermined weight of finely divided mold forming material from the receptacle into the flask and upon the pattern to form a mold.

4. Molding apparatus comprising means for moving in a predetermined path a flask assembled to a pattern, a receptacle for finely divided mold forming material having a discharge outlet through which the finely divided mold forming material in the receptacle is discharged to be delivered into the flask and upon the pattern to form a mold while the assembled flask and pattern are in said predetermined path, closure means for the discharge outlet of the receptacle so that a quantity of finely divided mold forming material may be retained in the receptacle, means for delivering finely divided mold forming material into the receptacle, weight responsive means for controlling the last mentioned means to discontinue delivery of finely divided mold forming material into the receptacle when a predetermined weight of such material has been so delivered and means for opening the closure means to discharge said predetermined weight of finely divided mold forming material from the receptacle into the flask and upon the pattern to form a mold while the assembled flask and pattern are moving in said predetermined path.

5. Molding apparatus comprising means for moving in a predetermined path a flask assembled to a pattern, a receptacle for finely divided mold forming material having a discharge outlet through which the finely divided mold forming material in the receptacle is discharged to be delivered into the flask and upon the pattern to form a mold while the assembled flask and pattern are in said predetermined path, closure means for the discharge outlet of the receptacle so that a quantity of finely divided mold forming material may be retained in the receptacle, means for delivering finely divided mold forming material into the receptacle, weight responsive means for controlling the last mentioned means to discontinue delivery of finely divided mold forming material into the receptacle when a predetermined weight of such material has been so delivered, means for opening the closure means to discharge said predetermined weight of finely divided mold forming material from the receptacle into the flask and upon the pattern to form a mold while the assembled flask and pattern are moving in said predetermined path and means outside the receptacle in the path of movement of the finely divided mold forming material from the receptacle into the flask agitating and aerating the finely divided mold forming material.

References Cited in the file of this patent

UNITED STATES PATENTS

| | | |
|---|---|---|
| 559,216 | Richards | Apr. 28, 1896 |
| 1,027,115 | Fahnestock | May 21, 1912 |
| 1,413,935 | Ramsey et al. | Apr. 25, 1922 |
| 1,721,063 | Barnes | July 16, 1929 |
| 1,806,042 | Carter | May 19, 1931 |
| 2,353,207 | Whittaker | July 11, 1944 |
| 2,626,053 | McIlvaine | Jan. 20, 1953 |
| 2,679,335 | Bell | May 25, 1954 |
| 2,767,445 | Taccone | Oct. 23, 1956 |
| 2,869,189 | Pirsig | Jan. 20, 1959 |

FOREIGN PATENTS

| | | |
|---|---|---|
| 15,835 | Switzerland | Dec. 31, 1897 |

UNITED STATES PATENT OFFICE
CERTIFICATION OF CORRECTION

Patent No. 3,007,216                  November 7, 1961

Loyal L. Johnston

It is hereby certified that error appears in the above numbered patent requiring correction and that the said Letters Patent should read as corrected below.

Column 1, line 72, after "moving" insert -- in --; column 3, line 41, for "showing" read -- shown --; column 6, line 6, for "and" read -- an --; line 24, for "2,959,825" read -- 2,959,828 --.

Signed and sealed this 10th day of April 1962.

(SEAL)
Attest:

ERNEST W. SWIDER
Attesting Officer

DAVID L. LADD
Commissioner of Patents